FIG. I.

INVENTORS
THOMAS HAMILTON and
CHARLES W. HAWKEY.
BY
ATTORNEY.

June 19, 1962 T. HAMILTON ETAL 3,039,497
FILAMENT-TRANSFERRING AND ORIENTING APPARATUS
Filed Jan. 16, 1959 7 Sheets-Sheet 4

INVENTORS
THOMAS HAMILTON and
CHARLES W. HAWKEY.
BY
ATTORNEY.

June 19, 1962  T. HAMILTON ETAL  3,039,497
FILAMENT-TRANSFERRING AND ORIENTING APPARATUS
Filed Jan. 16, 1959  7 Sheets-Sheet 5

INVENTORS
THOMAS HAMILTON and
CHARLES W. HAWKEY.
BY
ATTORNEY.

INVENTORS
THOMAS HAMILTON and
CHARLES W. HAWKEY.
BY
ATTORNEY.

United States Patent Office 3,039,497
Patented June 19, 1962

3,039,497
FILAMENT-TRANSFERRING AND ORIENTING APPARATUS
Thomas Hamilton, Verona, and Charles W. Hawkey, Caldwell, N.J., assignors to Westinghouse Electric Corporation, East Pittsburgh, Pa., a corporation of Pennsylvania
Filed Jan. 16, 1959, Ser. No. 787,165
10 Claims. (Cl. 140—71.6)

The present invention relates to filament-mounting machines for electrical devices, such as incandescent lamps and the like and, more particularly, to filament-transferring and orienting apparatus for such filament-mounting machines.

In the manufacture of incandescent lamps, a coiled-coil filament (produced by winding a primary coil around a second mandrel) is most commonly utilized because it is easier to mount with automatic filament-mounting machines than the single primary coil. In addition, such coiled-coil filament is more efficient because of the radiant heat exchange effect of the adjacent coils and the limited heat transfer to the argon gas within the bulb. During the second coiling of the coiled-coil filament, the mandrel from the primary coiling is left in place to prevent distortion of the first coil during such second coiling. When this mandrel is acid-dissolved out of the coiled-coil filament, the stresses induced in the filament during the second coiling cause spring-back in the coiled-coil filament so that the filaments vary about 4.0 mm. in length and hence in turns per inch, even though each such coiled-coil filament contains the same total length of uncoiled tungsten wire.

Heretofore the legs of the coiled-coil filament were mounted in the hooks provided in the lead wires of the stem by a filament-mounting machine of the type shown in U.S. Patent No. 2,736,344, issued February 28, 1956, to L. E. Dilts, which machine picked up the coiled-coil filament and positioned the legs in the hooks, closed the hooks on the filament legs, and stretched the mounted filament to a fixed lighted-filament length (i.e. length of filament between the lead wires).

Since a 1% change in the length of the uncoiled tungsten wire in the coiled-coil filament between the lead wires produces a 14% change in lamp life, the filament legs must be clamped in the lead wires very accurately. Such accurate positioning was not possible with this conventional apparatus. In an effort to improve the performance of this conventional filament-mounting machine, positioning pads were utilized (after the filament legs were positioned in the hooks) to force the ends of the filament legs inwardly to a fixed distance from the hooks. However, since firstly the positioning pads were only capable of pushing the filament legs 0.5 mm. inwardly before the flimsy filament distorted and since secondly the variation in the filament length in a normal batch of coils is 4.0 mm., this positioning technique was unreliable. It was then necessary to hand sort such coils into about eight groups, each group being within a 0.5 range of filament length. Each such group was delivered to the mounting machine in a separate container and if only one mounting machine was producing lamps of a given wattage, the mounting machine was adjusted and changed over as many as about eight times for a given production run of about 10,000 lamps, with each change-over requiring about ½ hour of lost production time.

It is the general object of the present invention to avoid and overcome the foregoing and other difficulties of and objections to prior art practices by the provision of filament-transferring and orienting apparatus which is operable to assure the uniform mounting of the coiled-coil filaments as they are fed randomly to the apparatus.

Another object of the present invention is the provision of filament-transferring and orienting apparatus which will provide the same length of uncoiled tungsten wire in each mounted filament and the same turns per inch in such mounted filament with attendant uniformity in the life of the resultant lamps.

The aforesaid objects of the present invention and other objects which will become apparent as the description proceeds, are achieved by providing a filament-transferring and orienting apparatus having filament-supporting means which are adjustable to secure each coiled-coil filament at a predetermined distance from the ends of the legs of such filament and to stretch each filament to the same length, and control apparatus which measures each coil before presentment to the filament-transferring and orienting apparatus, memorizes each size variation and transmits this information at the proper time to the filament-transferring and orienting apparatus to automatically cause the adjustment of the filament-supporting means in the proper position to guarantee that each gripped filament has the same total length of uncoiled tungsten wire between the filament-supporting means.

For a better understanding of the present invention reference should be had to the accompanying drawings, wherein like numerals of reference indicate similar parts throughout the several views and wherein:

FIG. 1 is a plan view of a filament-feeding device for presenting filaments in succession to a filament-measuring station as such filaments are transported along a line of movement, a filament-transferring and orienting apparatus disposed adjacent the delivery end of the filament-feeding device, control apparatus for measuring the length of each filament while the latter is at the filament-measuring station and operable to adjust a filament-supporting head for any variation in the length of the filament from a predetermined standard, a filament-transfer device for transferring the measured filament from the filament-feeding device to the adjusted filament-supporting head of the filament-transferring and orienting apparatus, while such head is at a filament-loading station, a portion of a conventional filament-mounting machine which disposes a stem to receive the oriented filament from the filament-transferring and orienting apparatus; and showing portions of the filament-supporting head at the filament-receiving station in horizontal section.

FIG. 18 is a view similar to FIGS. 16 and 17 and showing the introduction of the filament legs between the two pairs of "open" adjusted filament-leg gripping jaws at Station 3, the filament-receiving station, while FIG. 19 shows the adjusted filament-leg gripping jaws closed about the filament legs.

Although the principles of the present invention are broadly applicable to the measuring of a dimension of an article prior to its introduction into an article-supporting means of an automatic-fabricating machine and to the adjusting of article-supporting means to accommodate such measured article, the present invention is particularly adapted for use in conjunction with the measuring of coiled-coil filaments and the adjustment of a filament-supporting head of a filament-transferring and orienting apparatus to adjust the filament-supporting means to compensate for any variation in such dimension from a predetermined standard.

Figure 1:
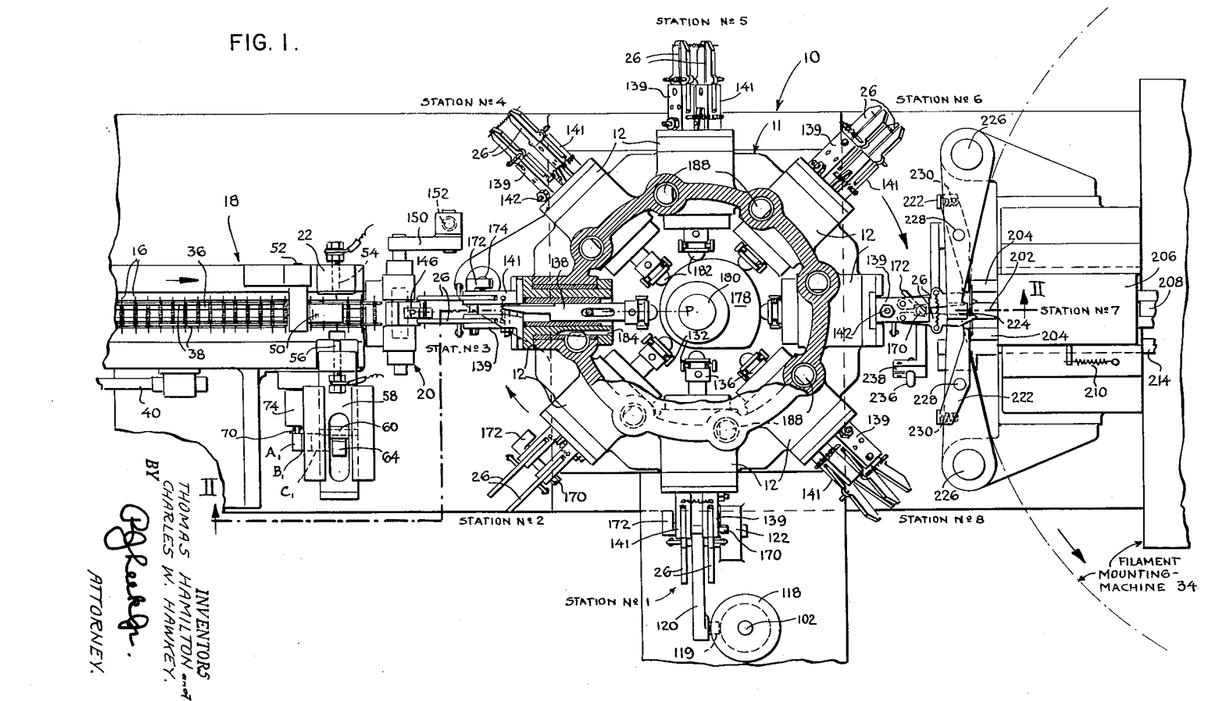
Figures 2, 2A:
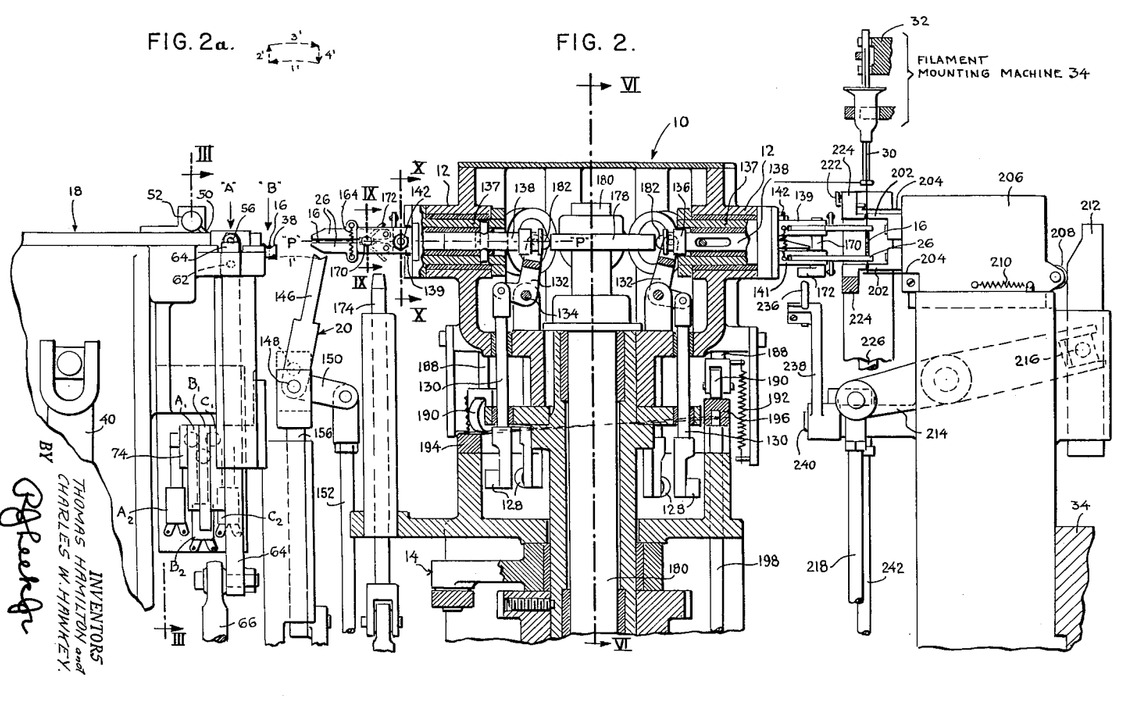
FIG. 2 is a vertical-sectional view along the line II—II of FIG. 1 in the direction of the arrows and showing the details of the associated devices and apparatus.
FIG. 2A is an operational diagram illustrating the path of movement of the filament holder of the filament-transfer device.
Figure 6:
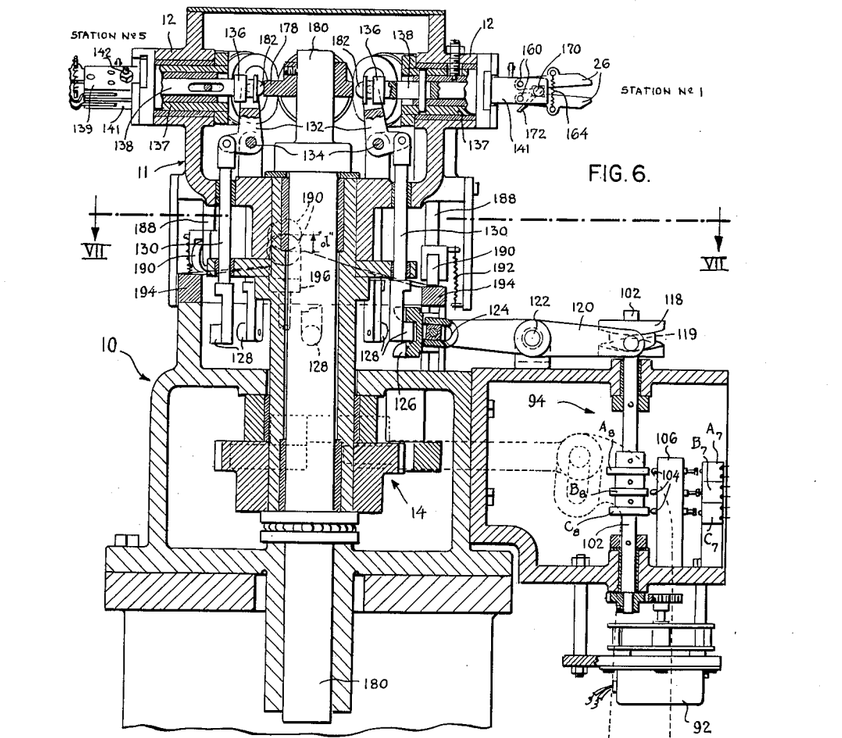
FIG. 6 is a vertical-sectional view of the filament-transferring and orienting apparatus taken along the line VI—VI of FIG. 2 in the direction of the arrows and showing an adjusting mechanism for adjusting the position of the filament-gripping jaws of the right-hand filament-supporting head of the filament-transferring and orienting apparatus to receive a measured filament, the indexing mechanism for the filament-transferring and orienting apparatus, the turning mechanism for the filament-supporting heads and the means operatively associated with the adjusting mechanism for separating the filament-leg gripping jaws after a filament is secured therein to cause stretching of the secured filament.
Figure 7:
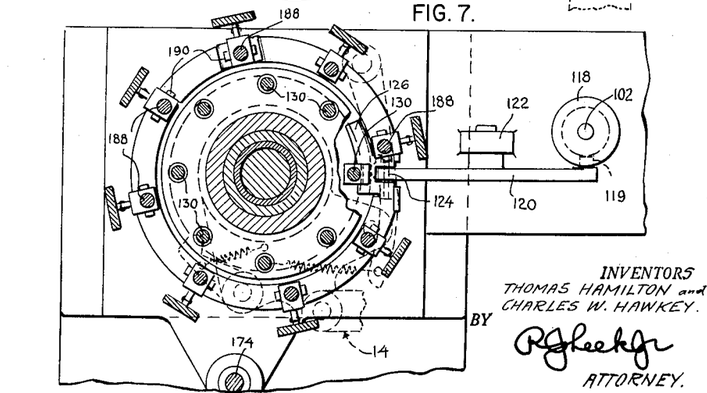
FIG. 7 is a horizontal-sectional view of a portion of the adjusting mechanism for the filament-leg gripping jaws and a portion of the indexing mechanism for the filament-transferring and orienting apparatus, taken along the line VII—VII of FIG. 6 in the direction of the arrows.
Figure 15:
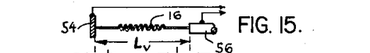
FIG. 15 is a diagrammatic side-elevational view of the filament being measured and the filament-measuring head at the instant when the control apparatus is energized.
Figure 30:
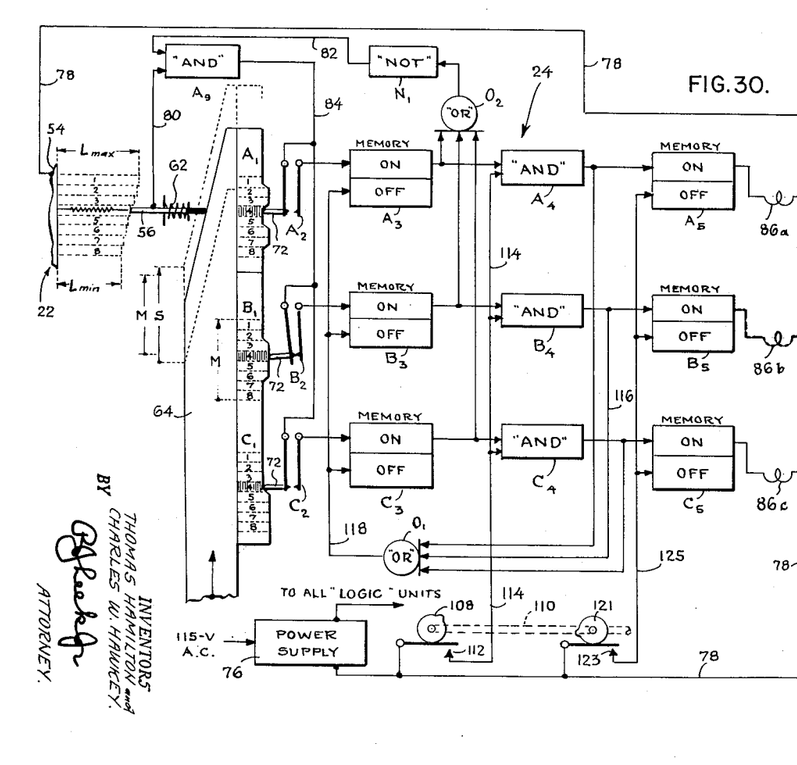
FIG. 30 is a diagrammatic view of the control apparatus of the present invention showing the filament-measuring head, the associated Cybernetic's Package circuitry utilized for controlling a Ledex-Motor control circuit, which circuit actuates the adjusting mechanism for the filament leg-gripping jaws on the heads of the filament-transferring and orienting apparatus to adjust the heads to the measured filaments.

With specific reference to the form of the present invention illustrated in the drawings, and referring particularly to FIGS. 1 and 2, a filament-transferring and orienting apparatus of the present invention is indicated generally by the reference numeral 10. This filament-transferring and orienting apparatus 10 is provided with a turret 11 on which are mounted a plurality of filament-supporting heads 12 (eight are shown in FIG. 1) which are indexable through a like number of work stations by a conventional indexing mechanism 14 (FIGS. 6 and 7). To provide automatic means for individually feeding filaments 16 to a filament-supporting head 12 at Station 3, the filament-receiving station, of the filament-transferring and orienting apparatus 10, the filaments 16 are disposed in spaced relation on a filament-feeding device 18 which indexes such filaments 16 (in timed relation with the indexing of the filament-transferring and orienting apparatus 10) toward a filament-supporting head at Station 3, the filament-receiving station. When a filament 16 having a length $L_v$ (FIG. 15) arrives at a position in its travel along the filament-feeding device 18 (which position is two indexes before such filament is transferred by a filament-transfer device 20 to the filament-supporting head 12 at Station 3), the filament is measured by a measuring head 22 of a control means 24 (FIG. 30). The control means 24 (of the type disclosed in U.S. patent application Serial No. 787,240, now Patent No. 2,927,679, filed Jan. 16, 1959, by C. M. Rively and assigned to the same assignee as the present invention) responds to the measuring information and causes the adjustment of the spacing (FIG. 16) between two pairs of open and empty filament-leg gripping jaws 26 on a filament-supporting head 12 at Station 1, the station for adjusting these filament-leg gripping jaws 26. This adjustment of the filament-leg gripping jaws 26 insures that when the filament-transfer device 20 deposits the measured filament 16 in the adjusted filament-leg gripping jaws 26 (FIG. 18) at Station 3, the filament-receiving station, and such jaws close about the legs of the measured filament 16 (FIG. 19) such legs project beyond the filament-leg gripping jaws 26 an equal distance, namely $a$ (FIGS. 16 and 19) on each side of the jaws 26.

Figure 20:
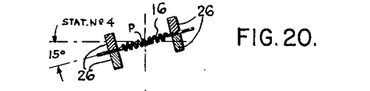
FIG. 20 is a view similar to FIGS. 16–19 and showing the turning of the filament-leg gripping jaws and the filament about 15° from the horizontal and the stretching of the filament during the indexing of the filament-supporting head from Station 3 to Station 4.
Figures 21, 22:
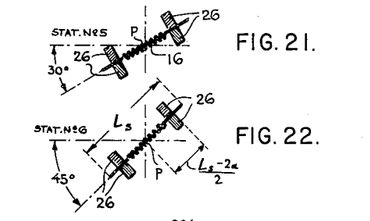
FIG. 21 is a view similar to FIGS. 16–20 showing the further 15° turning of the filament-leg gripping jaws and filament to a position about 30° from the horizontal and the continued stretching of such filament during the indexing of the filament-supporting head from Station 4 to Station 5.
FIG. 22 is a view similar to FIGS. 16–21 and showing a still further 15° turning of the filament-leg gripping jaws and filament to a position 45° from the horizontal and the continued stretching of such filament during the indexing of the filament-supporting head from Station 5 to Station 6.
Figure 27:
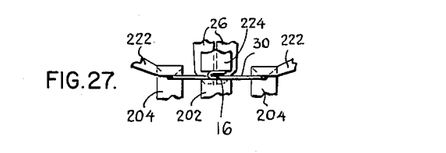
FIG. 27 is a view similar to FIG. 26 and showing the filament-clamping hammer in its forward position after the hooks have been clamped about the filament legs.
Figure 28:
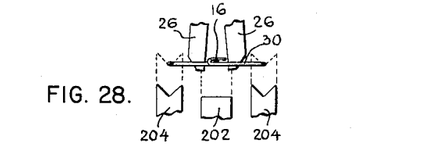
FIG. 28 is a view similar to FIGS. 26 and 27 showing the retraction of the lead-wire braces and the filament-clamping anvil, the opening of the filament-leg gripping jaws of the filament-transferring and orienting apparatus, preparatory for the indexing of the now open filament-leg gripping jaws out of Station 7, the filament-presenting station of the filament-transferring and orienting apparatus, and the simultaneous indexing of the filament mount in the head of the filament-mounting machine from the adjacent filament-mounting station of the filament-mounting machine.

The filament-supporting head 12 and filament 16 are then indexed successively from Station 3 (FIGS. 1 and 2) to Station 4, from Station 4 to Station 5 and from Station 5 to Station 6, during which indexes the filament-leg gripping jaws 26 are turned during each index about 15° in counterclockwise direction, as viewed in FIGS. 19–22, about the longitudinal axis P—P of the head 12 from the position shown in FIG. 19 to the position shown in FIG. 22 and such jaws are gradually separated in equal steps to slightly stretch the filament 16 from the length $L_v$ (FIG. 19) to the length $L_s$ (FIG. 22). The rotated filament-supporting head 12 and the now stretched filament 16 are then indexed into Station 7 where the legs of such rotated filament 16 clear hooks 28 provided in lead wires 30 (FIG. 23) of a lamp stem, held in a head 32 (FIGS. 1 and 14) of a conventional filament-mounting machine 34 and such legs are positioned in the plane of the hooks 28. The stretched filament 16 is then turned in counter-clockwise direction an additional 45° about the axis P—P from the position shown in FIG. 23 to the position shown in FIG. 25 so that the filament legs are introduced into the hooks 28, whereupon the hooks 28 are closed or clamped about such filament legs as shown in FIGS. 27 and 28. Thereafter the filament-gripping jaws 26 are opened to permit the head 32 (FIG. 2) of the filament-mounting machine 34 carrying the filament mount to index away from Station 7 to the next work station on such filament mounting machine 34, and the now empty filament-supporting head 12 to index to Station 8, an idle station. During indexes from Station 7 to Station 8 and thence to Station 1 the head 12 is returned to the starting position whereupon the above-described cycle is repeated.

Having described the general operation of the filament-transferring and orienting apparatus 10 and the control apparatus 24 the associated filament-feeding and filament transfer devices, and filament-mounting machine, a more detailed description of the various devices and apparatus will now be given, beginning with the filament-feeding device 18 (FIGS. 1–5 and 14).

*Filament-Feeding Device*

Figures 12, 13, 14:
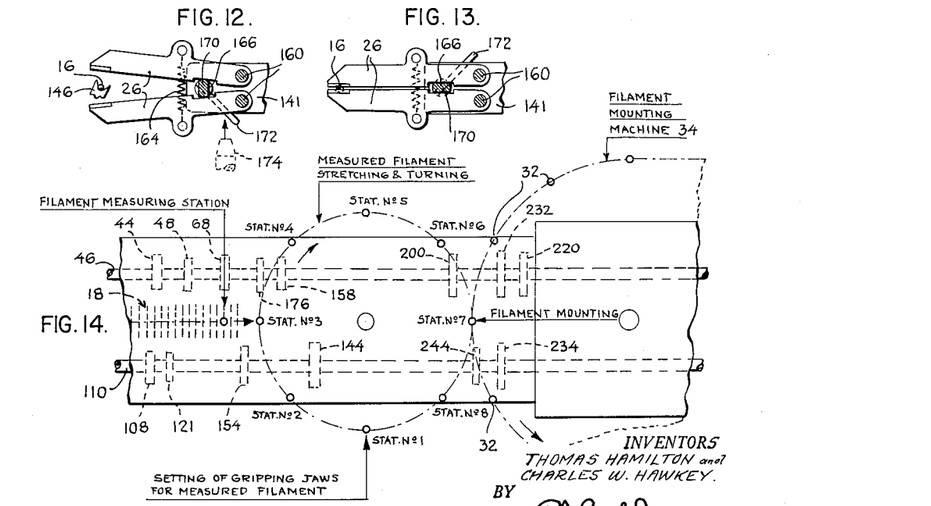
FIG. 12 is a vertical-sectional view of the operating mechanism for the filament-leg gripping jaws taken along the line XII—XII of FIG. 9 in the direction of the arrows and showing the jaws in the "open" position.
FIG. 13 is a view similar to FIG. 12 but showing the filament-leg gripping jaws in the "closed" position.
FIG. 14 is a diagrammatic plan view of the apparatus shown in FIG. 1 and showing also the drive shafts and associated cams for causing the various operations performed by such apparatus.

The conventional filament-feeding device 18 shown in FIGS. 1 through 5 and in FIG. 14 has a stationary filament-supporting plate 36 mounted on the frame portions of the device. Filaments 16 are fed manually or automatically into equi-spaced filament-supporting grooves 37 in the filament-supporting plate 36 and are advanced en masse one groove length at a time toward Station 3 by a pair of walking beams 38, the filament-receiving station of the filament-transferring and orienting apparatus 10 during each index of the apparatus 10.

Figure 5:
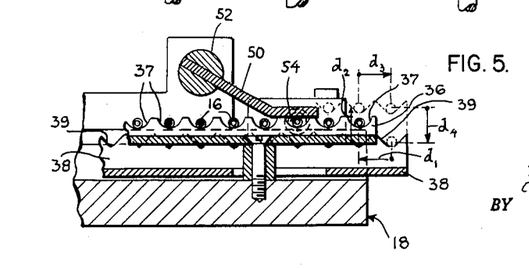
FIG. 5 is a vertical-sectional view along the line V—V of FIG. 4 in the direction of the arrows and showing the details of the filament-feeding device and a top-holding shoe disposed adjacent the filament-measuring station of the filament-feeding device for retaining a filament on the filament-feeding device during the filament-measuring operation.

Assuming the walking beams 38 are in the starting or solid-line position shown in FIG. 5, this advancing movement of the filaments 16 is accomplished by first moving the advancing grooves 39 in the walking beams 38 (which are spaced apart the same distance as the filament-supporting grooves 37) backward (i.e. horizontally to the left, as viewed in FIG. 5) one groove length or a distance $d_1$ from the solid-line lower position shown in such figure, to align the advancing grooves 39 with the filament-supporting grooves 37 thereabove. Upward movement of the walking beams 38 a distance $d_2$ to the dotted-line position shown in FIG. 5, causes the advancing grooves 39 to engage the legs of a number of the filaments 16 supported in the filament-supporting grooves 37, which correspond in number to the number of advancing grooves 39, and lift such filaments out of the filament-supporting grooves 37. The walking beams 38 and all the filaments 16 carried thereby are then advanced en masse one groove length or a distance $d_3$ to the right (while still in the elevated position) which again disposes the filaments 16 immediately above the filament-supporting grooves 37, whereupon the walking beams 38 are lowered a distance $d_4$ to deposit all the filaments 16 in the filament-supporting grooves 37 after which the walking beams 38 are returned to the solid-line position shown in FIG. 5.

To provide the above-described retracting and advancing (or horizontal reciprocating) movement for the walking-beams 38, a lever 40 (FIGS. 1 and 2) connected to such walking-beams 38 by suitable means (not shown) is moved by a cam 44 (FIG. 14) on a first drive shaft 46 of the filament-mounting machine 34 through conventional linkage (not shown). In like manner another cam 48 on this first drive shaft 46 is connected by suitable linkage and levers (not shown) for the purpose of causing the above-described lifting and lowering (or vertical reciprocating) movement of the walking beams 38.

When a filament 16 is advanced along the filament-feeding device 18 to a position A (FIG. 2) which is two indexes away from a transfer position B, such filament 16 is measured for length at position A by the measuring head 22 (FIGS. 1–4, 6 and 30) of the control means 24. So that the filament 16 being measured will not be moved out of the filament-supporting groove 37 during this measuring operation, a shoe 50 (FIGS. 1–5) is pivoted at 52 on the frame of the filament-feeding device 18. Normally such shoe 50 rests on top of the filament-supporting groove 37 to allow the filament 16 to be moved within the groove 37 during measuring without displacing it from the groove 37, the shoe 50 being free to pivot away from and toward the filament-supporting plate 36 during the advancing movement of the walking beams 38.

It will be understood that the filaments 16 are randomly fed to the filament-supporting grooves 37 of the filament-feeding device 18 and that such filaments 16 having a variable length $L_v$ (FIGS. 15 and 19) vary about 4.0 mm. in length (and hence in turns per inch) even though each such filament contains the same total length of uncoiled tungsten wire. Despite the variation in filament length, if first the filament length $L_v$ is measured and secondly the filament-leg gripping jaws 26 into which the measured filament 16 is to be transferred are adjusted to grip the legs of such measured filament 16 with constant equal projecting portions $a$ (FIGS. 16 and 29) then after the stretching of the measured filament 16 to a uniform length $L_s$ (FIG. 22), all such measured filaments will be mounted in the hooks 28 (FIGS. 23–28) of the stem with a uniform fixed lighted-filament length (i.e. length of uncoiled filament wire between the lead wires 30).

Inasmuch as the filaments vary about 4.0 mm. in length as above mentioned and are entirely acceptable when in the range of 20.6 mm. to 24.6 mm. ($L_{min.}$ to $L_{max.}$—FIG. 30), and the control means 24 is primarily designed for a total of eight function classifications, as hereinafter described more in detail, it is desirable to similarly classify the acceptable filament lengths into eight classes which can be done by dividing the 4.0 mm. variation into 0.5 mm. length ranges as follows:

| Class: | Length range in mm. |
|---|---|
| 1 | 24.1–24.6 |
| 2 | 23.6–24.1 |
| 3 | 23.1–23.6 |
| 4 | 22.6–23.1 |
| 5 | 22.1–22.6 |
| 6 | 21.6–22.1 |
| 7 | 21.1–21.6 |
| 8 | 20.6–21.1 |

The manner in which the measuring head 22 automatically measures and classifies the variable-length filaments 16 on the filament-feeding device at position A (FIG. 2) will now be described in detail.

*Measuring Head*

At the filament-measuring position A (FIG. 2) on the filament-feeding device 18, a stationary contact 54 is mounted on and electrically insulated from the frame of the filament-feeding device 18 on one side of the filament-supporting groove 37 in registry with one leg of the filament 16 to be measured. To provide a cooperating measuring means for the stationary contact 54, a movale contact 56 is insulatedly mounted for horizontal, reciprocable movement in a bracket 58 affixed to the frame of the filament-feeding device 18. As viewed in FIGS. 3, 4 and 30, this movable contact 56 is on the right-hand side of the filament-supporting plate 36, and in registry with the other leg of a filament 16 to be measured when disposed in the filament-supporting groove 37. This movable contact 56 is initially movable from its starting position toward the left, as viewed in FIGS. 3 and 4, to engage the adjacently disposed leg of the filament 16 to be measured and push it along the groove 37 to the left until the opposite leg thereof engages the stationary contact 54, whereupon the control means 24, as hereinafter described more in detail, is energized to cause adjustment of the filament-gripping jaws 26 (of a filament-supporting head 12 at Station 1 of the filament-transferring and orienting apparatus 10) preparatory for the reception of the measured filament 16 at Station 3. The stationary contact 54, filament 16 being measured, and the movable contact 56 function as a starting switch (FIG. 30) for the control means 24.

Figures 3, 4:
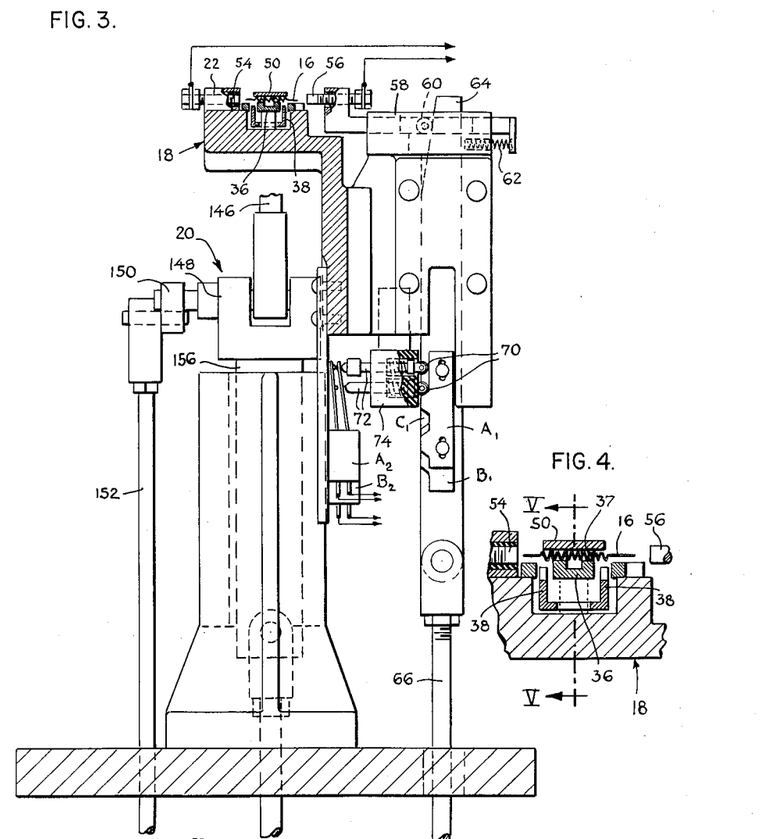
FIG. 3 is a vertical-sectional view showing the details of the filament-feeding device and a filament-measuring head of the control apparatus, and taken along the line III—III of FIG. 2 in the direction of the arrows and at the start of the filament-measuring operation.
FIG. 4 is an enlarged, fragmentary vertical-sectional view of the filament-measuring head and filament-feeding device shown in FIG. 3.

From a consideration of FIGS. 3, 4 and 30, it is apparent that the movable contact 56 must move horizontally from the starting position shown in FIGS. 3 and 4 (where it is retracted to permit advancing of the filaments 16 on the filament-supporting plate 36) a distance greater than the difference between 24.6 mm. ($L_{max.}$, FIG. 30) and 20.6 mm. ($L_{min.}$).

To provide this horizontal reciprocable movement of the movable contact 56, a roller 60 (FIG. 3) on the movable contact 56 is biased by a spring 62 into engagement with a wedge-shaped cam 64 forming a part of the control means 24 and which is mounted on a rod 66 for vertical recpirocating movement causing horizontal reciprocating movement of the bracket 58. The rod 66 is driven through conventional linkage (not shown) by a cam 68 (FIG. 14) on the first drive shaft 46 of the filament-mounting machine 34. As shown in FIG. 30 the wedge-shaped cam 64 reciprocates between the lower dotted-line position and the upper dotted-line position traveling a distance "S" in one direction. Of this distance "S," only the distance "M" is utilized for initiating operation of the control means 24 for measuring purposes.

Before proceeding with the detailed description of the function and operation of the measuring head, it is deemed advisable to first describe the control means 24 (FIGS. 2, 3, 6 and 30), which is operatively associated therewith.

*Control Means*

The control means 24 forming part of the present invention makes use of static switching devices which is now well known to the art of automatic control and are very succinctly shown and described in the article "Static Switching Devices" by Robert A. Mathias, published in the May 1957, issue of "Control Engineering." Although numerous logic-unit circuits for controlling under various desired conditions are apparent from such article, the control means 24 employs only the "AND"; "NOT"; "OR"; and "MEMORY" logic units, as hereinafter described, which it has been found give adequate control for the above noted eight filament-length classifications.

Figure 31:
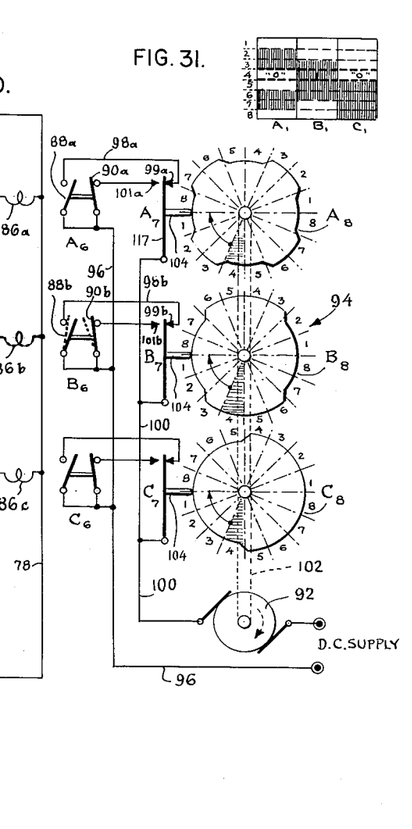
FIG. 31 is a diagrammatic view of the cyclical-binary code associated with the control apparatus of FIG. 30, the darkened areas representing the classes wherein the switches $A_2$, $B_2$ and $C_2$ of FIG. 30 are closed.

By reference now more particularly to FIGS. 30 and 31, it will be noted that the vertically reciprocable wedge-shaped cam 64 is provided with three switch operating cams $A_1$, $B_1$ and $C_1$, the cam surfaces of which are so interrelated to each other and to the tapered surface of the wedge-shaped cam 64, as well as to the respective rollers 70 (FIG. 3) carried by switch-operating spring-biased plungers 72, as to effectively operate as a cyclical-binary code corresponding to the eight filament-length classifications as above set forth. Solely for purposes of illustration it will be noted that in FIGS. 30 and 31 each of these cam surfaces $A_1$, $B_1$ and $C_1$ have been shown with eight graduations corresponding in total length to the distance "M" and with each cam surface and its respective graduations differing from the other surfaces in each instance. This relationship accordingly gives rise to the total of eight combinations of conditions as shown in FIG. 31 and which results in the cam surfaces $A_1$, $B_1$ and $C_1$ causing depression of the spring-pressed plungers 72 as the rollers 70 ride over the cam surfaces, with attendant closure of switches $A_2$, $B_2$ and $C_2$ in predetermined sequence. As shown in FIG. 3, the spring-biased plungers 72 are horizontally reciprocable in a housing 74 which, together with the control switches $A_2$, $B_2$ and $C_2$, are mounted on the filament-feeding device 18.

Also solely for illustrative purposes, the spacing between the stationary contact 54 and the movable contact 56 in FIG. 30 is shown with a total of eight graduations which are intended to depict the total of eight acceptable filament-lengths, varying from $L_{max.}$ to $L_{min.}$ within the classifications above noted, and which likewise corresponds to the eight combinations produced by the cam surfaces $A_1$, $B_1$ and $C_1$. Assuming now that the filament 16, having a length between 22.6 and 23.1 and hence in Class 4, is fed into position between the contacts 54 and 56, the upward movement of the wedge-shaped cam 64 will cause movement of the movable contact 56 into engagement with the adjacent end of the filament 16 and push it transversely of the supporting plate 36 until its opposite end engages the stationary contact 54 which immediately closes a circuit to the "AND" logic-unit $A_9$ from a "Power Supply" 76 through a conductor 78, the filament 16 and a conductor 80.

Since the "AND" function, as described in the above-mentioned article, operates only when a given number of input signals are applied thereto, which in the instant case are two such input signals, the other input signal is supplied from a "NOT" logic-unit $N_1$ through a conductor 82, with such "NOT" logic-unit $N_1$ being of the type which produces an output signal when no input signal is supplied thereto. The manner and conditions under which an input signal is supplied to the "NOT" logic-unit $N_1$ so that no output therefrom is supplied to the "AND" logic-unit $A_9$, will be hereinafter described. However, since the "NOT" logic-unit $N_1$ normally supplies one input signal to the "AND" logic-unit $A_9$, closure of the other input circuit by the filament 16 causes immediate closure of the $A_9$ output circuit extending from the latter through a conductor 84 to one side of each of the cam-operated control switches $A_2$, $B_2$ and $C_2$ and having their respectively plunger-rollers 70 engaging the cams $A_1$, $B_1$ and $C_1$ at the locations shown by the shaded area and constituting the No. 4 area of such cams as shown in FIG. 30. The other contact of each of these control switches is connected to identical but independent logic-units utilized, as hereinafter described more in detail, to cause operation of relays $A_6$, $B_6$ and $C_6$.

By reference to FIG. 30 it will be noted that with a Class 4, filament 16 being measured only the control switch $B_2$ is then closed by the cam-surface $B_1$, so that the other side of this switch $B_2$ completes a circuit successively to a first "MEMORY" logic-unit $B_3$, and "AND" logic-unit $B_4$ and a second "MEMORY" logic unit $B_5$, with the output from the latter being supplied to one side of a winding 86b of a relay $B_6$. These "MEMORY" logic-units $B_3$ and $B_5$ (as well as $A_3$—$A_5$ and $C_3$—$C_5$) are of the unlimited type and deliver an output following the imposition of an input signal, until such time as a second input signal is impressed thereon which then stops the output from such "MEMORY" logic-unit. The relay $B_6$ is provided with a pair of normally-open contacts 88b and a pair of normally-closed contacts 90b which form part of D.C. "energizing" circuit for a drive means, such as a Ledex Motor 92, for operating an adjusting mechanism 94 for the filament-leg gripping jaws 26 of a filament-supporting head 12 at Station 1 of the filament-transferring and orienting apparatus 10.

Accordingly with a Class 4 filament 16 being measured and with only control switch $B_2$ then closed, a signal from the "AND" logic-unit $A_9$ is then supplied to the "MEMORY" logic-unit $B_3$ causing a resultant output signal therefrom to both an "OR" logic-unit $O_2$ and the "AND" logic-unit $B_4$. This "OR" logic-unit $O_2$ is of the type described in the above mentioned article and produces an output which is fed to the "NOT" logic-unit $N_1$ whenever an input signal is received thereby from any one of the "MEMORY" logic-units $A_3$, $B_3$ and $C_3$. When an input signal is thus received by the "NOT" logic-unit $N_1$, the output signal therefrom is immediately removed from the "AND" logic unit $A_9$, with attendant cancellation of its output signal through control switch $B_2$ to the "MEMORY" logic-unit $B_3$, all of which occurs before the sections 4 of the cams $A_1$, $B_1$ and $C_1$ leave the rollers 70 of the plungers 72.

However, prior to the reception of the input signal by the "AND" logic-unit $B_4$ from the "MEMORY" logic-unit $B_3$ a signal-advancing cam 108, FIGS. 14 and 30, on a second drive shaft 110 of the filament-mounting machine 34, causes closure of a switch 112 thereby resulting in the supplying of the needed advancing output (independently of control switch $B_2$), through line 114 to the "AND" logic-unit $B_4$ and producing an output signal from the latter which is then supplied to both the "MEMORY" logic-unit $B_5$ and to an "OR" logic-unit $O_1$.

The input signal to the "OR" logic-unit $O_1$ through a conductor 116 results in an output signal to the "MEMORY" logic-unit $B_3$ through a line 118 with attendant cancellation of the output signal from the latter to the "OR" logic-unit $O_2$ and to the "AND" logic-unit $B_4$. However, an output signal from the "MEMORY" logic-unit $B_5$, which was induced by the now discontinued input signal thereto (from "AND" logic-unit $B_4$), continues to cause energization of the coil 86b, thereby resulting in the continuing closure of normally-open contact 88b and opening of the normally-closed contact 90b of the relay $B_6$ to the dotted-line position as shown in FIG. 30.

Closure of the normally-open contact 88b results in a closed "energization" circuit for the drive means 92, which extends from one side of a "D.C. Supply" source through a conductor 96, the now-closed contact 88b, a conductor 98b, a contact 99b of the switch $B_7$ and the conductor 100 to the drive means 92 and from the latter back to the other side of the "D.C. Supply" source, resulting in rotation of the cam shaft 102 and different shaped cams $A_8$, $B_8$ and $C_8$ carried thereby in clockwise direction, as viewed in FIG. 30. Solely for illustrative purposes these cams have been shown divided into eight segments on each side of their respective diameters corresponding to the above-mentioned acceptable filament classifications. Upon rotation thereof section 4 of such cams $A_8$, $B_8$ and $C_8$ eventually engage respective spring-biased plungers 104.

As cam sections 2 of the cams $A_8$, $B_8$ and $C_8$ move into engagement with the respective plungers 104, the continuing lowered portion of such sections 2 on the cams $B_8$ and $C_8$ causes no change in their respective switches $B_7$ and $C_7$ and the above-described portion of the "energization" circuit (associated with switch $B_7$) remains closed. However, the raised section of section 2 on the cam $A_8$ moves the operating blade 117 of its associated switch $A_7$ to the left, as viewed in FIG. 30, thereby causing such blade 117 to engage contact 101a with attendant closure of an additional by-pass "energization" circuit for the drive means 92, extending from the "D.C. Supply" through line conductor 96, normally-closed contact 90a, the now-closed contact 101a of the switch $A_7$, the line conductor 100 to the drive means 92 and thence to other side of "D.C. Supply."

Closure of these two energization circuits for the drive means 92 results in continuing clockwise rotation of the cams $A_8$, $B_8$ and $C_8$ (FIG. 30) to being their respective sections 3 into engagement with the spring-biased plungers 104. The continuing lowered section 3 of cam $C_8$ causes no change in its associated switch $C_7$. The raised section 3 causes no change in its associated switch $C_7$. The raised section 3 of the cam $B_8$ however causes movement of its plunger 104 and blade 117 to the left with the blade 117 moving away from the contact 99b of the switch $B_7$ and into engagement with the contact 101b, thereby opening the previously-closed "energization" circuit through the still-closed contact 88b. Since the normally-closed contact 90b is now open, a circuit is not then completed through such contact 90b even though contact 101b is now closed.

However, since section 3 of the cam $A_8$ is a continuing raised portion of section 2, the previously mentioned closed "energization" circuit still exists through the switch $A_7$ to the drive means 92 thereby resulting in the continuing rotation of the cams $A_8$, $B_8$ and $C_8$ to position 4.

The movement of the sections 4 of the cams $A_8$ and $B_8$ and $C_8$ into engagement with their respective plungers 104 causes no change in the condition of the switches $B_7$ and $C_7$. However, the lowered section 4 of the cam $A_8$ permits its plunger 104 to move to the right, as viewed in FIG. 30, with attendant movement of the blade 117 of the switch $A_7$ away from the contact 101a and into engagement with the contact 99a. This movement of the blade 117 opens the only remaining "energization" circuit for the drive means 92 which was closed by the contact 90a of the relay $A_6$ as well as the contact 101a of the switch $A_7$. The drive means 92 accordingly ceases to operate and the cam shaft 102 and cams $A_8$, $B_8$ and $C_8$ driven thereby cease to rotate. Shortly before the indexing of the filament-feeding device 18, a resetting cam 121 (FIGS. 14–30) on the second drive shaft 110 of the filament-mounting machine 34 closes a switch 123, thereby transmitting a voltage signal through conductor 125 to the "MEMORY" logic-unit $B_5$. This voltage signal cancels the output signal from "MEMORY" logic-unit $B_5$ to the coil $86b$ of the relay $B_6$ preparatory for the next filament-measuring and jaw-adjusting operation.

It will be obvious from the foregoing that if only one size or class of filament 16 were being measured, or high speed operation were not desired, only one control switch $B_2$ would be required and the energizing circuit closed thereby could directly include the coil $86b$ of the relay $B_6$. However, since the present apparatus is designed to measure filaments 16 of both shorter and longer lengths than the Class 4 filament as above described, the remaining control switches $A_2$ and $C_2$ together with identically associated logic-units and relays are provided to cause the desired operation of the drive means 92 at the appropriate time. The only difference in the operation from that above-described, resides in a shorter upward travel of the wedge-shaped cam 64 before the movable contact 56 engages a filament 16 of greater length than the above-mentioned Class 4 filament, and such wedge-shaped cam 64 travels upward a somewhat greater distance before such movable contact 56 contacts a filament 16 of shorter length than a Class 4 filament. In either instance, however, when the wedge-shaped cam 64 does cause the filament 16 to close a circuit to the "AND" logic-unit $A_9$, then the respective cam surfaces $A_1$, $B_1$ or $C_1$ will be in such position, depending upon the filament length, as to cause closure of one of the control switches $A_2$, $B_2$ or $C_2$. Upon the closure of any one of such control switches, its associated logic-units (which are identical to that above described with respect to the control switch $B_2$) are caused to operate in the same manner with attendant energization of the respective relays $86_a$, $86_b$ or $86_c$ and closure of identical "energization" circuits to the drive means 92 under control of the rotating cams $A_8$, $B_8$ or $C_8$, as the case may be.

*Adjusting Mechanism for Filament-Leg Gripping Jaws*

This above-described clockwise rotation (FIG. 30) of the cam shaft 102 from position 1 to position 4 is utilized in accordance with the present invention to adjust the filament-leg gripping jaws 26 (of a filament-supporting head 12 at Station 1 of the filament-transferring and orienting apparatus 10) to receive such measured filament 16 when a head 12 is indexed to Station 3. For this purpose a helical lifting cam 118 (FIG. 6) on the cam shaft 102 is disposed in operative engagement with a roller 119 on a lever 120 pivoted at 122. A yoke 124 on the free end of the lever 120 is connected to a cam track 126 which is vertically reciprocable in the frame portions of the filament-transferring and orienting apparatus 10. As the filament-supporting head 12 indexes into Station 1 from Station 8 a roller 128 carried by a rod 130 which is frictionally reciprocable in the frame portions of the filament-transferring and orienting apparatus 10 engages the cam track 126. The frictionally reciprocable rod 130 is connected by a bell-crank lever 132 (pivoted at 134) and a yoke 136 to an operating wedge 138 which is horizontally slidable within a rotatable body 137 of the filament-supporting head 12. This body 137 rotates about the longitudinal axis P—P (FIGS. 2 and 8) of the filament-supporting head 12, the geometric axis being utilized, as hereinafter explained, to produce uniform length of filament between the leading-in and supporting conductors to which it is connected.

Figure 8:
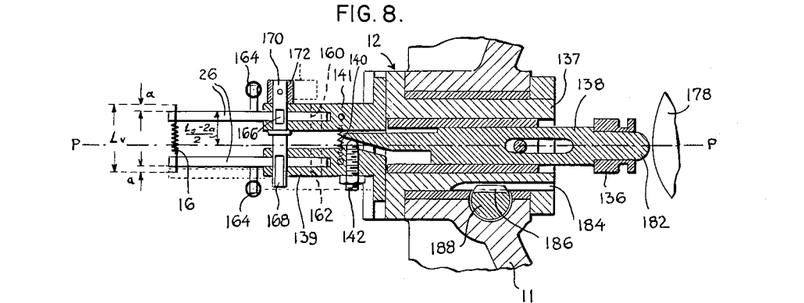
FIG. 8 is an enlarged fragmentary horizontal-sectional view of a filament-supporting head of the filament-transferring and orienting apparatus at Station 3, the filament-receiving station, the view being similar to that shown in FIG. 1.
Figures 9, 10:
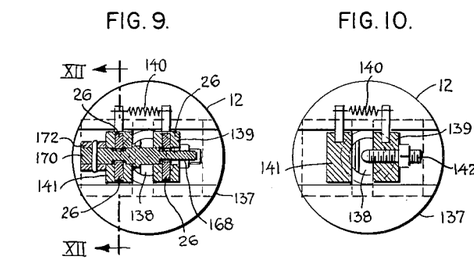
FIG. 9 is a vertical-sectional view of the mechanism for opening and closing the filament-leg gripping jaws, taken along the line IX—IX of FIG. 2 in the direction of the arrows at Station 3, the filament-receiving station, and showing such operating mechanism in open position.
FIG. 10 is a vertical-sectional view taken along the line X—X of FIG. 2 in the direction of the arrows, showing the position of the adjusting mechanism for the filament-leg gripping jaws (while at Station 3, the filament-receiving station) at the beginning of the filament-stretching operation.
Figure 11:
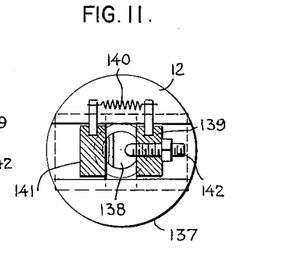
FIG. 11 is a view similar to FIG. 10 but showing the position of the adjusting mechanism after the filament-supporting head has indexed into Station 6 and the filament-stretching operation has been completed.

As shown in FIG. 8, the movable pair of filament-leg gripping jaws 26 is mounted on a bracket 139 slidable in the head 12 and biased by a spring 140 to a fixed bracket 141 on which the pair of fixed filament-leg gripping jaws 26 is mounted so that an adjustable spacer 142 affixed to the slidable bracket 139 rides on the operating end of the wedge 138.

Figures 16, 17:
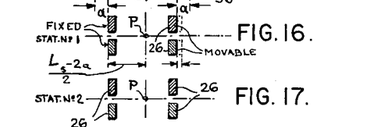
FIG. 16 is a diagrammatic side-elevational view of the filament-leg gripping jaws (while in the "open" position at Station 1, the adjusting station for the filament-leg gripping jaws) and taken looking in from the outside periphery of the filament-transferring and orienting apparatus.
FIG. 17 is a view similar to FIG. 16 of the adjusted filament-leg gripping jaws, while at Station 2, an idle station.
Figure 29:
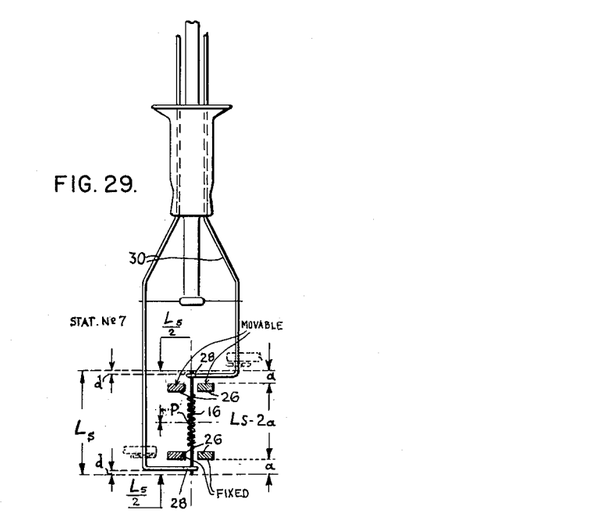
FIG. 29 is a side-elevational view of the filament mount preparatory to its departure from the now-open filament-gripping jaws at Station 7 of the filament-transferring and orienting apparatus.

It will be apparent that the previously described clockwise rotation, as viewed in FIG. 30, of the cam shaft 102 and the helical lifting cam 118 carried thereby from position 1 to position 4 causes the left-hand end of the lever 120, as viewed in FIGS. 6 and 7, the yoke 124, the cam track 126 and the frictionally-reciprocable rod 130 to move upwardly with resultant counterclockwise rotation of the bell crank lever 132, and retraction of the operating wedge 138 to the left, as viewed in FIG. 6, and to the right as viewed in FIG. 8. This retraction of the wedge 138 permits the spacer 142 to ride downwardly on the operating end of the wedge 138 and the spring-biased pair of movable filament-leg gripping jaws 26 to move closer to the pair of fixed filament-leg gripping jaws. This lateral spacing of the filament-leg gripping jaws 26 from each other permits such jaws to receive the previously measured filament 16 (which was the "third" filament from the end on the filament-feeding device 18 when at position A of FIG. 2) with an equal amount of overhang $a$ (FIG. 15) on either side of such jaws, when the filament-supporting head 12 arrives at Station 3. As shown in FIGS. 8, 16 and 29, the pair of fixed filament-leg gripping jaws 26 (shown in the upper portion of FIG. 8) is always disposed a distance $$\frac{L_s - 2a}{2}$$

from the longitudinal axis P—P of the filament-supporting head 12, where $L_s$ (FIG. 29) is the final stretched length of all filaments 16 preparatory to mounting. The distance from the axis P—P to the movable pair of jaws 26 (shown in the right-hand portion of FIG. 16) is less than $$\frac{L_s - 2a}{2}$$

After the lateral spacing between filament-leg gripping jaws 26 has been set to receive the previously measured filament 16 by the above-described operation of the measuring head 22, the control means 24 and adjusting mechanism 94; a cam 144 (FIG. 14) on the second drive shaft 110 of the filament mounting means 34 actuates the conventional indexing mechanism 14 (FIGS. 6 and 7) to cause the adjusted filament-supporting head 12 at Station 1 to be indexed to Station 2, an idle station. Simultaneously therewith the previously measured filament 16 is advanced by the filament-feeding device 18 to the right, as viewed in FIG. 1, one position closer to position B (intermediate A and B) (FIG. 2), the transfer position. During this indexing of the filament-supporting head 12 to Station 2, the roller 128 (FIG. 6) on the rod 130 rides out of the cam track 126 but the filament-leg gripping jaws 26 remain in the adjusted position since the rod 130 (FIG. 6) is frictionally held by its bearings in its adjusted position. During the next indexing movement of the filament-transferring and orienting apparatus 10, the adjusted filament-supporting head 12 is moved from Station 2, the idle station, to Station 3, the filament-receiving station and the previously measured filament 16 is advanced on the filament-feeding device 18 to position B (FIG. 2) from which it is transferred by the filament-transfer device 20 to the open but adjusted filament-leg gripping jaws 26 at Station 3.

*Filament-Transferring Device*

Figure 18:
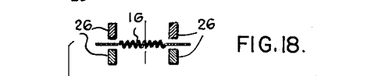

The filament-transferring device 20, shown in FIGS 1, 2 and 3, has a filament cradle 146 adapted to receive and support the barrel of the previously measured filament 16 being transferred. Such filament cradle 146 is adapted to be swung from the solid-line position shown in FIG. 2, where it is in alignment with the filament-leg gripping jaws 26 to the left (per dotted arrow 1' FIG. 2a) into alignment with the previously measured filament 16 at position B of the filament-feeding device 18. Such filament cradle 146 is then moved upwardly in the direction of the dotted arrow 2' (FIG. 2a) to engage the barrel of the filament 16 and to remove the latter from the last advancing groove 39 in the walking beams 38 at position B. The filament cradle 146 and the previously measured filament 16 carried thereby are then swung to the right while in the elevated position, as indicated by the dotted arrow 3' in FIG. 2a, to deposit the legs of this previously measured filament 16 in the spaced preset filament-leg gripping jaws 26 as shown in FIGS. 8 and 18. Thereafter the filament cradle 146 is moved downwardly, as indicated by the dotted arrow 4' (FIG. 2a), to the position shown in FIG. 2, leaving the measured filament 16 in the filament-leg gripping jaws 26.

In order to swing the filament cradle 146 through the above-described oscillating movement, such filament cradle is pivoted at 148 and an arm 150 on such pivot 148 is connected by a connecting rod 152 and other conventional linkage (not shown) to a cam 154 on the second drive shaft 110 of the filament-mounting machine 34 (FIG. 14). The means utilized to vertically reciprocate the filament cradle 146 comprises mounting the pivot 148 for such filament cradle 146 on a slide 156 which is vertically reciprocable in the frame portions of the filament-feeding device 18 by a cam 158 on the first drive shaft 46 of the filament-mounting machine 34, the cam 158 being suitably coupled to the slide 156 by conventional means (not shown).

After the previously measured filament 16 has been deposited in the open preset filament-leg gripping jaws 26 at Station 3, such jaws are closed about the legs of the measured filament 16 (FIG. 19) by jaw-closing mechanism at Station 3, the filament-receiving station.

*Jaw-Closing Mechanism*

As shown adjacent Station 1 in FIG. 6, the pair of fixed filament-leg gripping jaws 26 are individually pivoted at 160 on the fixed bracket 141 and the pair of movable filament-leg gripping jaws 26 (FIGS. 2, 8, 12 and 13) are individually pivoted at 162 on the slidable bracket 139. In addition, each associated pair of filament-leg gripping jaws 26 is biased by springs 164 (FIGS. 2 and 6) about cam sections 166 and 168 (FIG. 8) provided on a shaft 170 journalled in the brackets 141 and 139. The cam sections 166 and 168 are rectangular in cross section, utilizing the long side of such sections (FIG. 12) to keep the jaws open and the short side (FIG. 13) to close the jaws. Since the slidable bracket 139 is movable with respect to the shaft 170 and the cam section 168 thereof, the cam section 168 is desirably longer than the cam section 166. In order to cause the clockwise rotation of the shaft 170 and the cam sections 166 and 168 from the "jaw-opening" position, shown in FIGS. 6 and 12, to the "jaw-closing" position, shown in FIGS. 2 and 13, the shaft 170 is provided with a radially extending contact arm 172. The means utilized to move the contact arm 172 from the "down" or "jaw-opening" position, shown in FIG. 12, to the "up" or "jaw-closing" position, shown in FIG. 13, comprises a plunger 174 (FIG. 2) slidably mounted in the frame portions of the filament-transferring and orienting apparatus 10 and driven through conventional linkage (not shown) from a cam 176 (FIG. 14) on the first drive shaft 46 of the filament mounting machine 34.

After the legs of the previously measured filament 16 have been deposited in the filament-leg gripping jaws 26 (FIGS. 8 and 18) by the filament-transfer device 18 with an equal overhang $a$ on either side thereof, the jaw-opening cam 176 (FIG. 14) causes the plunger 174 to move upwardly, as viewed in FIG. 2. During this upward movement the plunger 174 moves the contact arm 172 clockwise from the "down" or "jaw-opening" position shown in FIG. 12 to the "upper" or "jaw-closing" position, shown in FIG. 13, where the short sides of the cam sections 166 are positioned between the spring-biased jaws 26, thereby securing the legs of the previously measured filament 16 within the now-closed filament-leg gripping jaws 26.

Thereafter, the filament-supporting head 12 and the previously measured filament 16 carried thereby are indexed from Station 3, the filament-receiving station, to Station 4, during which indexing movement the filament-leg gripping jaws 26 are separated slightly (thereby stretching the previously measured filament 16 from the length $L_v$ shown in FIG. 19 to the length shown in FIG. 20) by means operatively associated with the operating wedge 138 of the adjusting mechanism 94 for separating the jaws 26. In addition, the jaws 26 and the filament 16 are turned 15° about the longitudinal axis P—P (FIG. 2) during this index from the horizontal to the position shown in FIG. 20 by a turning mechanism for the filament-supporting heads 12.

*Jaw-Separating Mechanism*

The means utilized for laterally separating the filament-leg gripping jaws 26 during the above-mentioned index from Station 3 to Station 4 of the filament-transferring and orienting apparatus 10 comprises a cam 178 (FIGS. 1, 2 and 6) affixed to the top of a center post 180 upon which the turret 11 is indexable. The periphery of this cam 178 is contoured so that the cam is not engaged by a cam follower 182 carried by the slidable operating wedge 138 during the indexing of the filament-supporting head from Station 1 to Station 3 even though the filament-leg gripping jaws 26 may have been set at Station 1 for the smallest class of filament 16 (namely Class 8 extending from 20.6 mm. to 21.1 mm.) and the cam follower 182 is in its innermost position, as viewed in FIG. 1.

As the filament-supporting head 12 is indexed from Station 3 to Station 4, the periphery of the cam 178 forces the cam follower 182 and the wedge 138 outwardly, as viewed in FIG. 1, so that the spacer 142 carried by the slidable bracket 139 rides upwardly on the operating end of the operating wedge 138 and the pair of movable filament-leg gripping jaws 26 (shown as the lower jaws of FIG. 8) is moved away from the pair of stationary jaws 26 thereby stretching slightly the previously measured filament 16 from the position shown in FIG. 19 to the position shown in FIG. 20. At this point the distance from the axis P—P (FIG. 20) to the pair of movable jaws 26 is still less than $$\frac{L_s - 2a}{2}$$

the distance from axis P—P to the pair of fixed jaws. During the stretching operation the filament-supporting head 12 is simultaneously turned 15° about the axis P—P by the turning mechanism.

*Turning Mechanism*

As shown in FIGS. 1, 2, 6 and 8, the body 137 of each filament-supporting head 12 is mounted for rotation within the turret 11 of the filament-transferring and orienting apparatus 10 about the longitudinal axis P—P of the head 12 and has a toothed segment 184 (FIG. 8) on its periphery disposed adjacent and in engagement with a rack portion 186 of a rod 188 (FIGS. 1, 2, 6 and 7) slidable in the frame portions of the filament-transferring and orienting apparatus 10. In order to cause vertical reciprocating movement of the rod 188 and resultant rotation of the housing 137 of the filament-supporting head 12, a roller 190 on the bottom of the rod 188 is biased by a spring 192 (FIGS. 2 and 6) into engagement with a cam track 194 extending peripherally around the filament-transferring and orienting apparatus 10.

As the filament-supporting head 12 indexes from Station 3, the filament-receiving station, to Station 4, the roller 190 (FIG. 2) rides up a slightly inclined portion of the cam track 194 between such stations causing the rod 188 and the rack portion 186 thereon to move upwardly, with resultant rotation of the body 137, the filament-leg gripping jaws 26 and the previously measured filament 16 secured therein in counterclockwise direction, as viewed in FIG. 19, through an angle of 15° about the axis P—P to the position shown in FIG. 20.

Thereafter as such filament-supporting head indexes from Station 4 to Station 5, the previously measured filament 16 is further stretched by the operation of the cam 178 from the position shown in FIG. 20 to the position shown in FIG. 21. Simultaneously therewith during such index the cam track 194 further moves the roller 190, the rod 188 and the rack portion 186, upwardly to further rotate the body 137, the jaws 26 and the previously measured filament 16 an additional 15° in counterclockwise direction about the axis P—P from the position shown in FIG. 20 to the 30° angle shown in FIG. 21.

As the filament-supporting head 12 indexes from Station 5 to Station 6, the filament-leg gripping jaws 26 are further rotated counterclockwise 15° about the axis P—P to the 45° position shown in FIG. 22 and such previously measured filament is stretched to a final stretched length $L_s$ as also shown in FIG. 22. The distance between axis P—P and the pair of movable jaws 26 (FIG. 29) is now equal to $$\frac{L_s - 2a}{2}$$

the distance between axis P—P and the pair of fixed jaws 26. The center of the stretched filament 16 now lies on the longitudinal axis P—P of the filament-supporting head 12.

With the previously measured filament 16 disposed in the 45° position shown in FIG. 22, such filament is ready for the indexing thereof from Station 6 to Station 7, the filament-presenting station, and the introduction of the legs of such filament (FIG. 23) between the hooks 28 in the lead wires 30 of the stem secured in the head 32 at the filament-mounting station of the filament-mounting machine 34 adjacent such Station 7. Such filament 16 is then aligned in the plane of the hooks 28 preparatory for the insertion of the legs of the filament 16 thereinto.

Figure 23:
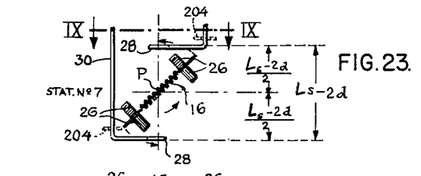
FIG. 23 is a fragmentary side-elevational view of the lower portions of the lead wires of a filament mount secured in a head of the filament-mounting machine and showing the stretched rotated filament indexed into position between such lead wires at Station 7, the filament-presenting station, preparatory for the introduction of the filament legs in the hooks provided in the ends of the lead wires.
Figure 25:
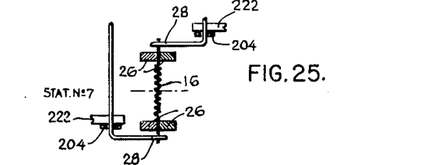
FIG. 25 is a view similar to FIG. 23 and showing the filament-leg gripping jaws and the filament turned 45° from the position shown in FIG. 23 to insert the legs of such filament into the open hooks on the lead wires.

When the filament-supporting head 12 arrives at Station 7 the filament-presenting station, the roller 190 rides onto a vertically reciprocable section 196 of the cam track 194, which section 196 is movable upwardly, as viewed in FIG. 6, a distance $d$ (indicated by the arrow in such figure) to similarly elevate the roller 190, the rod 188 and the rack portion 186 with resultant rotation of the housing 137, the filament-leg gripping jaws 26 and the stretched previously measured filament 16 secured therein an additional 45° in counterclockwise direction about the axis P—P from the position shown in FIG. 23 to that shown in FIG. 25 (which is 90° from its original position when initially picked up, as shown in FIG. 19) where the legs of the filament 16 are positioned in the hooks 28 preparatory for the filament-leg clamping operation. Since the hooks are spaced apart a distance (FIGS. 23 and 29) $L_s - 2d$ and are equi-spaced from the longitudinal axis P—P of the filament-supporting heads 12, the legs project from the hooks 28 an equal distance $d$ on each side. Each mounted filament 16 will accordingly have the same lighted-filament length of $L_s - 2d$, when mounted.

In order to accomplish this final rotation of the previously measured filament 16, the reciprocable section 196 (FIG. 6) is mounted on a slidable operating rod 198 which is connected by conventional linkage (not shown) to a cam 200 (FIG. 14) on the first-drive shaft 46 of the filament-mounting machine 34.

Filament-Leg Clamping

Figure 24:
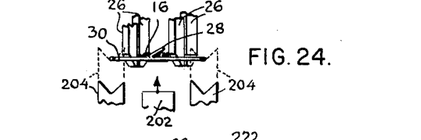
FIG. 24 is a vertical-sectional view along the line XXIV—XXIV of FIG. 23 in the direction of the arrows and showing lead-wire braces and a filament-clamping anvil (associated with the filament-mounting machine) in the retracted position adjacent Station 7 of the filament-transferring and orienting apparatus, preparatory for the clamping of the oriented filament legs in the hooks.
Figure 26:
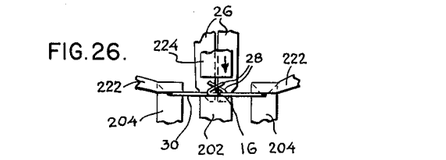
FIG. 26 is a view similar to FIG. 24 and showing the lead-wire braces in engagement with the lead wires, the anvil advanced against the hooks in filament-clamping position, and lead-wire positioning arms also in engagement with the lead wires to secure the latter against the lead-wire braces, and illustrating the movement of a filament-clamping hammer toward the hooks resting against the filament-clamping anvil.

After the legs of the previously measured filament 16 have been inserted into the hooks 28 at Station 7, the filament-presenting station, of the filament-transferring and orienting apparatus 10, a filament-clamping anvil 202 (FIGS. 1 and 2) and a pair of lead-wire braces 204 (associated with the filament-mounting machine 34 at the filament-mounting station) are moved inwardly toward the hooks 28 and the legs positioned therein from the position shown in FIG. 24 to the position shown in FIG. 26. As shown in FIGS. 1 and 2, the filament-clamping anvil 202 and lead-wire braces 204 are mounted on a slide 206 which is horizontally reciprocable in the frame portions of the filament-mounting machine 34. Such slide 206 has a roller 208 biased by a spring 210 into engagement with a cam 212 which is vertically reciprocable also in the frame portions of the filament-mounting machine 34. The means utilized to vertically reciprocate the cam 212 and cause the resultant horizontal movement of the slide 206 (and the anvil 202 together with the lead-wire braces 204 inwardly from the position shown in FIG. 24 to the position shown in FIG. 26) comprises a lever 214 coupled to the cam 212 at 216 and connected by a connecting rod 218 and conventional linkage (not shown) to a cam 220 (FIG. 14) on the first drive shaft 46 of the filament-mounting machine 34.

Thereafter, lead-wire positioning arms 222 and an associated filament-clamping hammer 224 (one for each hook 28) are swung inwardly toward the associated hook 28 positioned on the anvil 202 and the lead wires 30 on the lead-wire braces 204, the lead-wire positioning arms 222 securing the lead wires 30 in guide slots provided in the lead-wire braces 204 (FIG. 26) before the hammers 224 engage the open hooks 28. The hammers 224 continue inwardly towards such open hooks 28 from the position shown in FIG. 26 to the position shown in FIG. 27 to close the hooks 28 about the legs of the previously measured filament 16.

To permit the above-described swinging movement of the hammers 224 and the lead-wire positioning arms 222, each hammer 224 is mounted on a vertically extending rod 226 (FIGS. 1 and 2) which is rotated in the frame portions of the filament-mounting machine 34 and each lead-wire positioning arm 222 is pivoted at 228 on the associated hammer 224. In order that each lead-wire positioning arm 222 engages the lead wire 30 before the associated hammer 224 engages the hooks 28, the lead-wire positioning arm 222 is biased by a spring 230 (FIG. 1) into a position forward of the operating end of the hammer 224. The means utilized to cause the rotation of the rods 226, hammers 224 and lead-wire positioning arms 222 toward the hooks 28 and the lead wires 30 comprises conventional linkage for connecting the rod 226, shown in the upper portion of FIG. 1, to a cam 232 (FIG. 14) on the first drive shaft 46 and the other rod 226 to a cam 234 on the second drive shaft 110 of the filament-mounting machine 34.

After the clamping of the legs of the previously measured filament 16 in the hooks 28 has been accomplished, the hammers 224 and lead-wire positioning arms 222 are swung backwardly from the position shown in FIGS. 1 and 27 and the anvil 202 and lead-wire braces 204 are retracted to the position shown in FIGS. 24 and 28. Preparatory to the indexing of the head 32 of the filament-mounting machine 34 out of the filament-mounting station, the filament-leg gripping jaws 26 are moved from the closed position shown in FIG. 27 to the open position shown in FIG. 28. In order to move the contact arm 172 from a position similar to the closed position shown in FIG. 13 to a position similar to the open position shown in FIG. 12, an operation pin 236 (FIG. 2) is mounted on a bell-crank lever 238 pivoted at 240 on the frame portions of the filament-mounting machine 34 and the other end of the lever 238 is connected by a rod 242 and conventional linkage (not shown) to a jaw-opening cam 244 (FIG. 14) on the second drive shaft 110 of the filament-mounting machine 34.

At a time determined by the jaw-opening cam 244 the connecting rod 242 is moved downwardly, as viewed in FIG. 2, and the operating pin 236 swung from the position shown in such figure into engagement with the contact arm 172, thereby moving the latter from a position similar to that shown in FIG. 13, to a position similar to that shown in FIG. 12, thus causing rotation of the cam sections 166 and 168 with resultant opening of the filament-leg gripping jaws 26. It will be understood that in order to permit the indexing of the now empty and open filament-leg gripping jaws 26 from Station 7, the filament-presenting station, to Station 8, that the operating pin 236 is immediately thereafter retracted to the position shown in FIG. 2 by operation of the jaw-opening cam 244. Thereafter, the filament-supporting head 12 of the filament-transferring and orienting apparatus 10 indexes from Station 7, the filament-presenting station, to Station 8 and during such index the head 12 is turned 45° in clockwise direction about the axis P—P to the position shown in FIG. 1. Simultaneously therewith, or later as desired, the head 32 (FIG. 2) of the filament-mounting machine 34 indexes from the filament-mounting station of such machine 34. The filament-supporting head 12 then indexes from Station 8 to Station 1, the station for adjusting the filament-leg gripping jaws 26, and such head 12 is further turned 45° in clockwise direction about the axis P—P to the position shown in FIG. 1. Thereafter, the above-described filament-measuring, filament-leg adjusting, filament-rotating and filament-stretching, filament-presenting and filament-mounting operations are repeated.

It will thus be obvious to those skilled in the art that the objects of the present invention have been achieved by the provision of a filament-transferring and orienting apparatus which is operable to assure the uniform mounting of filaments as such filaments are randomly fed to the apparatus. Such filament-transferring and orienting apparatus will provide the same length of uncoiled tungsten wire in the lighted length of each mounted filament and the same turns per inch in such mounted filament thereby insuring uniformity in the life of later produced incandescent and discharge lamps.

While in accordance with the patent statutes one best known embodiment of the present invention has been illustrated and described in detail, it is to be particularly understood that the invention is not limited thereto or thereby.

We claim:

1. Fabricating apparatus comprising article-supporting means operable to secure an article at predetermined locations thereon, adjusting means operatively connected to the article-supporting means for adjusting the article-supporting means preparatory for securing the article at said predetermined locations, control apparatus adjacent the article-supporting means for measuring a dimension of the article prior to the introduction of the article into the article-supporting means, said control apparatus being operatively connected to the adjusting means and operable to cause the adjusting means to adjust the article-supporting means so that the latter may secure the article at said predetermined locations as determined by said control apparatus.

2. Apparatus for transferring articles from an article-receiving station of such apparatus to an article-feeding station, comprising adjustable article-supporting means adapted to receive an article while at the article-receiving station and operable to secure the article at predetermined locations thereon, said article-supporting means being movable through a plurality of work stations including the article-receiving station to the article-feeding station, adjusting means at one work station prior to the article-feeding station operatively connected to the article-supporting means while the latter is at said one work station for adjusting the latter preparatory for securing the article at said predetermined locations, control apparatus adjacent the article-receiving station for measuring a dimension of the article prior to the introduction of the article into the article-supporting means, said control apparatus being operatively connected to the adjusting means and operable to cause the adjusting means to adjust the article-supporting means at said one station so that the article-supporting means may secure the article at the predetermined locations when the article-supporting means arrives at the article-receiving station.

3. Fabricating apparatus comprising a fixed article-gripping means and a movable article-gripping means, said article-gripping means being adapted to receive an article and operable to secure the article at predetermined locations thereon, adjusting means operatively connected to said movable article gripping means for adjusting the movable article-gripping means preparatory for securing the article at said predetermined locations, control apparatus adjacent the article-gripping means for measuring a dimension of the article prior to the introduction of the article into the article-gripping means, said control apparatus being operatively connected to the adjusting means and operable to cause the adjusting means to adjust the movable article-gripping means so that the article-gripping means may secure the article at said predetermined locations as determined by said control apparatus.

4. Fabricating apparatus comprising a fixed article-gripping means and a movable article-gripping means, said article-gripping means being adapted to receive an article and operable to secure the article at predetermined locations along its length, an operating member disposed between the fixed article-gripping means and the movable article-gripping means and operatively connected to the latter, drive means connected to the operating member for moving the operating member and causing movement of the movable article-gripping means to laterally space the movable article-gripping means from the fixed article-gripping means preparatory for securing the article at said predetermined locations, control apparatus adjacent the article-gripping means for measuring a dimension of the article prior to the introduction of the article into the article-gripping means, said control apparatus being operatively connected to the drive means and operable to actuate the drive means to cause the operating member to adjust the movable article-gripping means so that the article-gripping means may secure the article at said predetermined locations.

5. Apparatus for transferring articles from an article-receiving station of such apparatus to an article-presenting station, comprising adjustable article-supporting means adapted to receive an article while in an open position at the article-receiving station and operable to secure the article at predetermined locations thereon while in closed position, said article-supporting means being movable through a plurality of work stations including the article-receiving station to the article-presenting station, a first operating means connected to said article-supporting means operable to move the latter between the open and closed positions, adjusting means at one work station prior to the article-feeding station operatively connected to the article-supporting means while the latter is at said one station for adjusting the article-suporting means preparatory for securing the article at said predetermined locations, control apparatus adjacent the article-receiving station for measuring a dimension of the article prior to the introduction of the article into the article-supporting means, said control apparatus being operatively connected to the adjusting means and operable to cause the adjusting means to adjust the article-supporting means at said one station so that the article-supporting means may secure the article at the predetermined locations when the article-supporting means arrives at the article-receiving station, and a second operating means at the article-receiving station movable into engagement with said first operating means to cause the latter to move the article-supporting means into closed position about the article.

6. Apparatus for transferring articles from an article-receiving station of such apparatus to an article-presenting station, comprising adjustable article-supporting means adapted to receive an article while in an open position at the article-receiving station and operable to secure the article at predetermined locations along its length while in closed position, said article-supporting means being movable through a plurality of work stations including the article-receiving station to the article-presenting station, a first operating means connected to said article-supporting means and operable to move the latter between the open and closed positions, adjusting means at one work station prior to the article-feeding station operatively connected to the article-supporting means while the latter is at said one station for adjusting the article-supporting means preparatory for securing the article at said predetermined locations, control apparatus adjacent the article-receiving station for measuring a dimension of the article prior to the introduction of the article into the article-supporting means, said control apparatus being operatively connected to the adjusting means and operable to cause the adjusting means to adjust the article-supporting means at said one station so that the article-supporting means may secure the article at the predetermined locations when the article-supporting means arrives at the article-receiving station, a second operating means at the article-receiving station movable into engagement with said first operating means to cause the latter to move the article-supporting means into closed position about the article, and a third operating means at the article-presenting station movable into engagement with said first operating means to cause the latter to move the article-supporting means into open position thereby releasing the article.

7. Apparatus for transferring articles from an article-receiving station of such apparatus to an article-feeding station and orienting the articles en route, comprising adjustable article-supporting means adapted to receive an article in a first position while at the article-receiving station and operable to secure the article at predetermined locations thereon, said article-supporting means being movable through a plurality of work stations including the article-receiving station to the article-feeding station, turning means on said article-supporting means and operable by movement of the article-supporting means from the article-receiving station to the article-presenting station to move the article from the first position to a second position thereby orienting the article, adjusting means at one work station prior to the article-feeding station connected to the article-supporting means for adjusting the latter preparatory for securing the article at said predetermined locations, control apparatus adjacent the article-receiving station for measuring a dimension of the article prior to the introduction of the article into the article-supporting means, said control apparatus being operatively connected to the adjusting means and operable to cause the adjusting means to adjust the article-supporting means at said one station so that the article-supporting means may secure the article at the predetermined locations when the article-supporting means arrives at the article-receiving station.

8. Apparatus for transferring articles from an article-receiving station of such apparatus to an article-presenting station, orienting the articles en route and positioning the articles in a sub-assembly at the article-presenting station, comprising adjustable article-supporting means adapted to receive an article in a first position while at the article-receiving station and operable to secure the article at predetermined locations on such article, said article-supporting means being movable through a plurality of work stations including the article-receiving station to the article-presenting station, turning means on said article-supporting means and operable by movement of the article-supporting means from the article-receiving station to the article-presenting station to move the article from the first position to a second position thereby orienting the article so that such article may be introduced into the sub-assembly, adjusting means at one work station prior to the article-feeding station connected to the article-supporting means for adjusting the latter preparatory for securing the article at said predetermined locations, control apparatus adjacent the article-receiving station for measuring a dimension of the article prior to the introduction of the article into the article-supporting means, said control apparatus being operatively connected to the adjusting means and operable to cause the adjusting means to adjust the article-supporting means at said one station so that the article-supporting means may secure the article at the predetermined locations when the article-supporting means arrives at the article-receiving station, and means at the article-presenting station engageable by said turning means and operable to cause the turning means to move the article with respect to the sub-assembly thereby positioning the article in the sub-assembly preparatory for the joining of the article to the sub-assembly.

9. Fabricating apparatus for resilient articles comprising a fixed article-gripping means and a movable article-gripping means, said article-gripping means being adapted to receive a resilient article and operable to secure the resilient article at predetermined locations along its length, said article-supporting means being movable through a plurality of work stations including an article-receiving station to an article-presenting station, an operating member disposed between the fixed article-gripping means and the movable article-gripping means and operatively connected to the latter, drive means at one station prior to the article-receiving station connected to the operating member for moving the movable article-gripping means to laterally space the movable article-gripping means from the fixed article-gripping means preparatory for securing the resilient article at said predetermined locations at the article-receiving station, control apparatus adjacent the article-receiving station for measuring a dimension of the resilient article prior to the introduction of the resilient article into the article-gripping means, said control apparatus being operatively connected to the drive means and operable to actuate the drive means to cause the operating member to adjust the movable article-gripping means so that the article-gripping means may secure the resilient article at said predetermined locations, and stationary means engageable by the operating member as it moves along the path of movement between the article-receiving station and the article-presenting station and operable to cause the operating member to separate the movable article-gripping means from the fixed article-gripping means thereby stretching the resilient article a predetermined amount.

10. Apparatus for transferring filaments from a filament-receiving station of the apparatus to a filament-presenting station, orienting the filaments en route and positioning the filaments in the hooks of a lamp stem positioned at the article-presenting station; comprising a fixed filament-gripping means and a movable filament-gripping means, said filament-gripping means being adapted to receive a filament in a first position while such filament-gripping means are in an open position and operable to secure the filament at predetermined locations equi-distant from the ends of the legs of such filament while in closed position, said filament-gripping means being movable through a plurality of work stations including a filament-receiving station to a filament-presenting station, an operating member disposed between the fixed filament-gripping means and the movable filament-gripping means and operatively connected to the latter, drive means at one station prior to the filament-receiving station connected to the operating member for moving the movable filament-gripping means to laterally space the movable filament-gripping means from the fixed filament-gripping means preparatory for securing the legs of the filament at said predetermined locations when the filament-gripping means arrives at the filament-receiving station, control apparatus adjacent the filament-receiving station for measuring the length of the filament prior to the introduction of the filament into the filament-gripping means, said control apparatus being operatively connected to the drive means and operable to actuate the drive means to cause the operating member to adjust the movable filament-gripping means so that the filament-gripping means may secure the legs of the filament at said predetermined locations, a first operating means connected to the filament-gripping means and operable to move the latter between the open and closed positions, a second operating means at the filament-receiving station movable into engagement with said first operating means to cause the latter to move the movable filament-gripping means into closed position about the legs of the filament, turning means on the filament-gripping means and operable by movement of the latter from the filament-receiving station to the filament-presenting station to move the filament from the first position to a second position thereby orienting the filament so that the filament may be introduced between the hooks of the lamp stem at the filament-presenting station, stationary means engageable by the operating member as it moves along the path of movement between the filament-receiving station and the filament-presenting station and operable to cause the operating member to separate the movable filament-gripping means from the fixed filament-gripping means thereby stretching the filament a predetermined amount, means at the filament-presenting station engageable by said turning means and operable to cause the turning means to move the filament with respect to the hooks of the lamp stem thereby positioning the legs of the filament in the hooks preparatory for the clamping of the legs to the hooks, and a third operating means at the filament-presenting station movable into engagement with said first operating means after the hooks are clamped about the legs of the filament to cause the latter to move the filament-supporting means into open position thereby releasing the legs of the filament.

References Cited in the file of this patent

UNITED STATES PATENTS

| | | |
|---|---|---|
| 2,297,950 | Flaws | Oct. 6, 1942 |
| 2,748,235 | Wallace | May 29, 1956 |
| 2,927,679 | Rively | Mar. 8, 1960 |